(12) United States Patent
Morita

(10) Patent No.: US 7,553,567 B2
(45) Date of Patent: Jun. 30, 2009

(54) FUEL CELL SYSTEM

(75) Inventor: Koji Morita, Yokohama (JP)

(73) Assignee: Nissan Moto Co., Ltd., Kanagawa (JP)

( * ) Notice: Subject to any disclaimer, the term of this patent is extended or adjusted under 35 U.S.C. 154(b) by 876 days.

(21) Appl. No.: 10/525,509

(22) PCT Filed: Aug. 27, 2003

(86) PCT No.: PCT/JP03/10833

§ 371 (c)(1), (2), (4) Date: Feb. 24, 2005

(87) PCT Pub. No.: WO2004/021494

PCT Pub. Date: Mar. 11, 2004

(65) Prior Publication Data

US 2006/0166071 A1    Jul. 27, 2006

(30) Foreign Application Priority Data

Aug. 30, 2002 (JP) .............................. 2002-252738

(51) Int. Cl.
- *H01M 8/00* (2006.01)
- *H01M 8/04* (2006.01)
- *H01M 8/12* (2006.01)
- *H01M 2/00* (2006.01)
- *H01M 2/02* (2006.01)
- *H01M 2/14* (2006.01)

(52) U.S. Cl. .............................. 429/12; 429/22; 429/34; 429/39

(58) Field of Classification Search ................... 429/12, 429/22, 34, 39
See application file for complete search history.

(56) References Cited

U.S. PATENT DOCUMENTS

| | | | | |
|---|---|---|---|---|
| 3,516,867 A | * | 6/1970 | Dankese | ....................... 429/26 |
| 4,973,530 A | | 11/1990 | Vanderborgh et al. | |
| 6,416,895 B1 | | 7/2002 | Voss et al. | |

FOREIGN PATENT DOCUMENTS

| | | |
|---|---|---|
| EP | 1 030 396 A1 | 8/2000 |
| JP | 2000-164232 | 6/2000 |
| WO | WO 96/24958 | 8/1996 |

* cited by examiner

*Primary Examiner*—Patrick Ryan
*Assistant Examiner*—Julian Mercado
(74) *Attorney, Agent, or Firm*—McDermott Will & Emery LLP

(57) ABSTRACT

A fuel cell assembly has a fuel cell stack (1) provided with a polymer electrolyte membrane (2), an air electrode (4) and a fuel electrode (3); an air supply device (19) for supplying air; a fuel gas supply device (20) for supplying fuel gas, and a humidity regulation module (5) allowing movement of water from a humid air passage (6) to a dry air passage (7). The air electrode (4) is divided into an upstream air electrode (4*a*) and a downstream air electrode (4*b*). The air supplied from the air supply device (19) is supplied to the upstream air electrode (4*a*) after passing through the dry air passage (7). The air discharged from the upstream air electrode (4*a*) is supplied to the downstream air electrode (4*b*) after passing through the humid air passage (6).

17 Claims, 17 Drawing Sheets

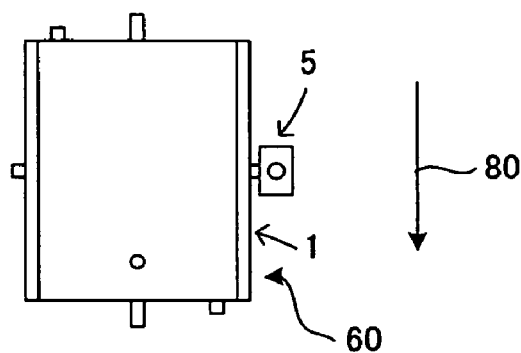
FIG. 5A
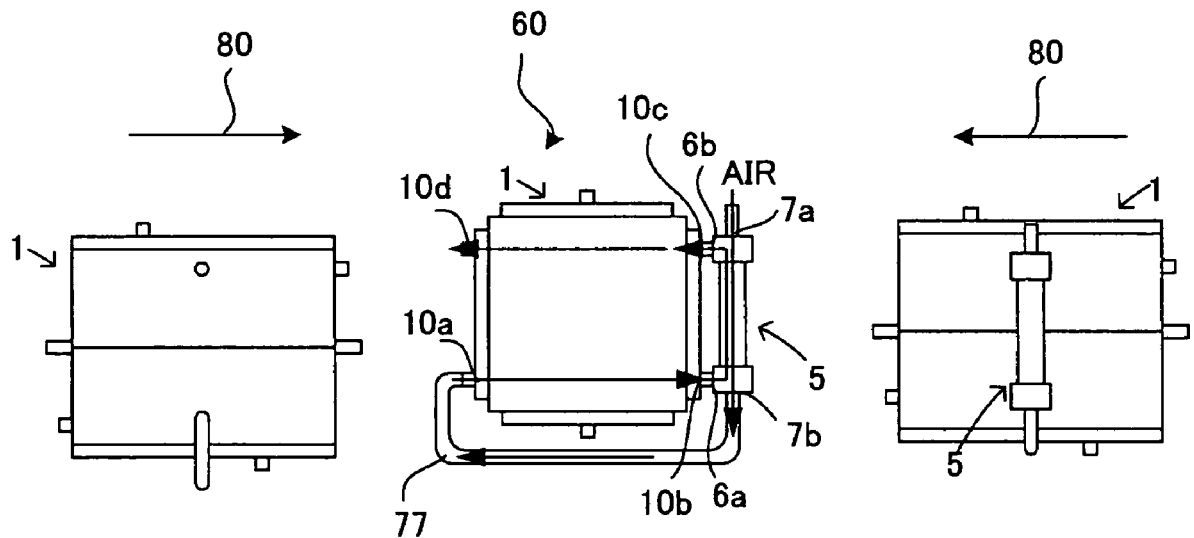
FIG. 5B
FIG. 5C
FIG. 5D
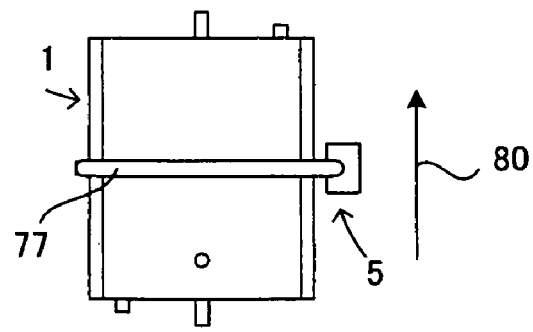
FIG. 5E

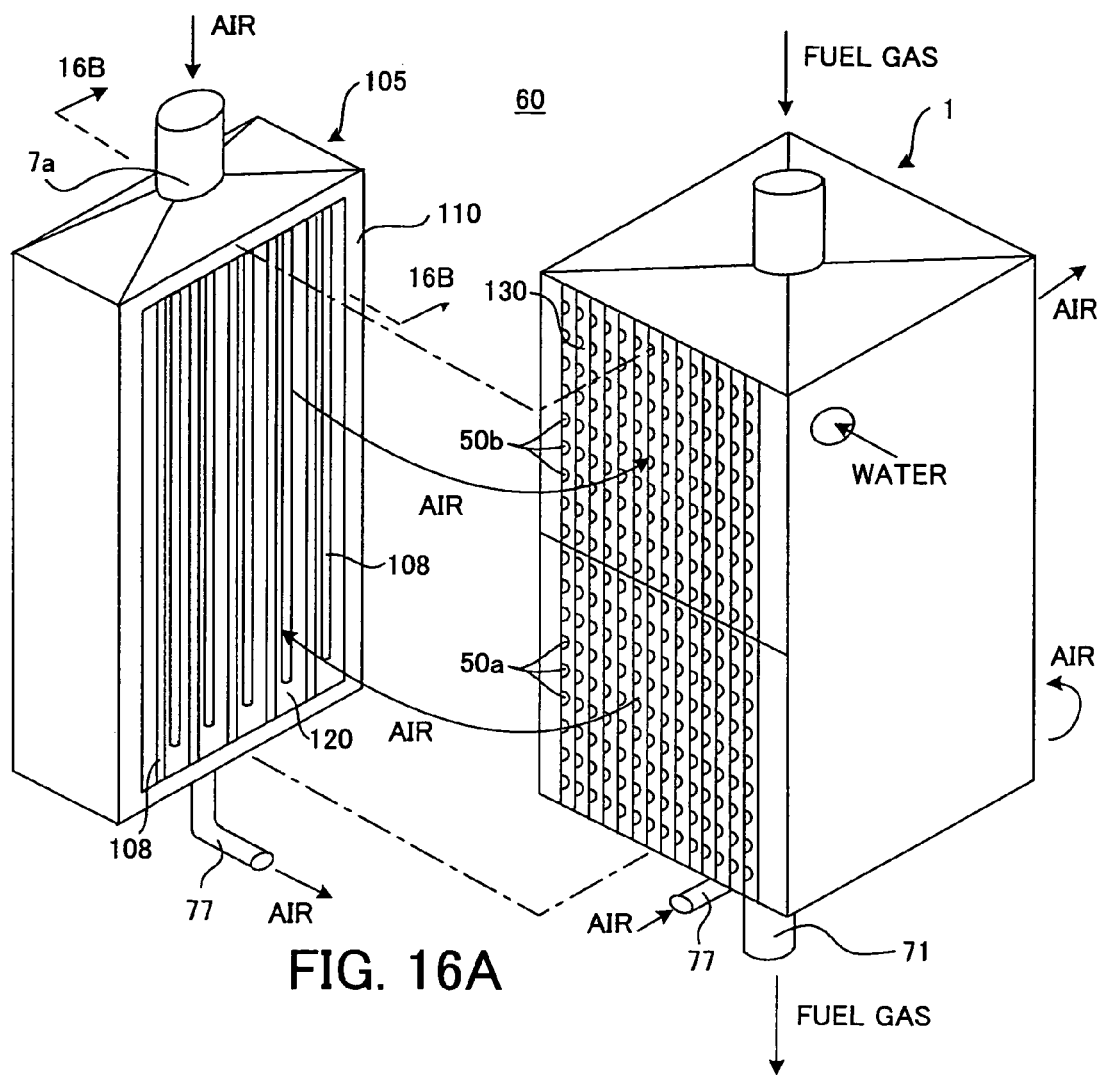
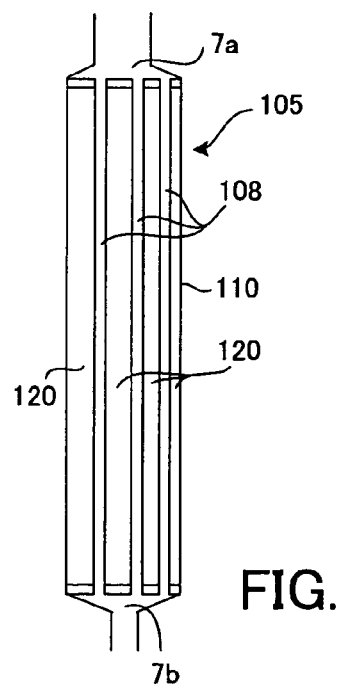
FIG. 16A
FIG. 16B

FUEL CELL SYSTEM

FIELD OF THE INVENTION

This invention relates to a fuel cell system and in particular, to water management in the oxygen electrode of the fuel cell, in other words, the cathode.

BACKGROUND OF THE INVENTION

Tokkai 2000-164232 published by the Japanese Patent Office in 2000 discloses a humidity regulation module for a fuel cell. The humidity regulation module comprises a dry air passage disposed in an air supply channel to the air electrode (oxygen electrode) and a humid air passage disposed in a discharge channel from the air electrode. Discharge air having a high moisture content flows through the humid air passage and supplied (fresh) air having a low moisture content flows through the dry air passage. As a result, since the moisture contained in the discharge air is transferred to the supplied air, the air to be supplied to the fuel cell is humidified.

SUMMARY OF THE INVENTION

Oxygen is consumed in response to the rate of the electrochemical reaction for the power generation in the vicinity of the air electrode of the fuel cell according to the reaction ($1/2 O_2 + 2H^+ + 2e^- \rightarrow H_2O$). The consumption of oxygen results in production of an amount of water which is twice the amount of the consumed oxygen.

In a prior-art fuel cell system, moisture in the air in the humid air passage disposed downstream of the air electrode returns to the dry air passage upstream of the air electrode. Further, in an air channel facing the air electrode, air absorbs water from the air electrode in proximity to the air channel inlet and transports the absorbed water to the vicinity of the air channel outlet. Thus the air channel in the vicinity of the air channel outlet contains moisture added in the dry air passage as well as moisture from the produced water in the air electrode. On the other hand, since oxygen is consumed while passing through the air channel facing the air electrode, the molar fraction of oxygen in the air is small in proximity to the air channel outlet. When an excess in the molar fraction of moisture and a shortfall in the molar fraction of oxygen occur in the air channel in this manner, fuel cell operations are impeded as a result of a decrease in the partial pressure of oxygen in the air channel or as a result of excessive condensation of water in the air electrode.

It is therefore an object of this invention to provide a fuel cell assembly suppressing excessive moisture content and a shortfall in the oxygen content in air in proximity to the air channel outlet.

In order to achieve the above object, this invention provides a fuel cell assembly comprising: a fuel cell having first and second oxygen electrodes, a hydrogen electrode and an electrolyte membrane disposed between the hydrogen electrode and the first and second oxygen electrodes; a hydrogen gas channel for supplying fuel gas containing hydrogen to the hydrogen electrode, the hydrogen gas channel facing the hydrogen electrode; a first oxidant gas channel for supplying oxidant gas to the first oxygen electrode, the first oxidant gas channel facing the first oxygen electrode; a second oxidant gas channel for supplying the oxidant gas which has passed through the first oxidant gas channel to the second oxidant electrode, the second oxidant channel facing the second oxygen electrode; and a dehumidifier for dehumidifying the oxidant gas which has passed through the first oxidant gas channel, the dehumidifier being disposed downstream of the first oxidant gas channel and upstream of the second oxidant gas channel.

Further, this invention provides a fuel cell system comprising: a fuel cell having an electrolyte membrane, an air electrode and a fuel electrode; the electrolyte membrane being disposed between the air electrode and the fuel electrode; an air supply device for supplying air to the air electrode; a fuel gas supply device for supplying fuel gas to the fuel electrode; and a humidity regulation module having a dry air passage and a humid air passage and allowing movement of water from the humid air passage to the dry air passage. The air electrode is divided into an upstream section and a downstream section with respect to a flow of supplied air. Air supplied from the air supply device passes through the upstream section of the air electrode after passing through the dry air passage of the humidity regulation module, and air discharged from the upstream section of the air electrode is supplied to the downstream section of the air electrode after passing through the humid air passage of the humidity regulation module.

The details as well as other features and advantages of this invention are set forth in the remainder of the specification and are shown in the accompanying drawings.

BRIEF DESCRIPTION OF THE DRAWINGS

FIG. 3 shows a fuel cell stack according to the first embodiment.

FIG. 5 shows the assembly of the humidity regulation module and the fuel cell stack according to the first embodiment. FIG. 5A is an upper view, FIG. 5B is a left view, FIG. 5C is a front view, FIG. 5D is a right view and FIG. 5E is a bottom view. The arrow shows the direction of lamination in the fuel cell stack.

FIG. 15A shows a humidity regulation module in which hollow fiber membranes are evenly spaced. FIG. 15B shows a humidity regulation module in which hollow fiber membranes are unevenly spaced. FIG. 15C shows an assembly in which an air supply passage is integrated with a fuel gas manifold.

FIG. 16A is an exploded perspective view of the assembly shown in FIG. 15B. FIG. 16B is a sectional view taken in the line 16B-16B of FIG. 16A.

DESCRIPTION OF THE PREFERRED EMBODIMENTS

Figure 1:
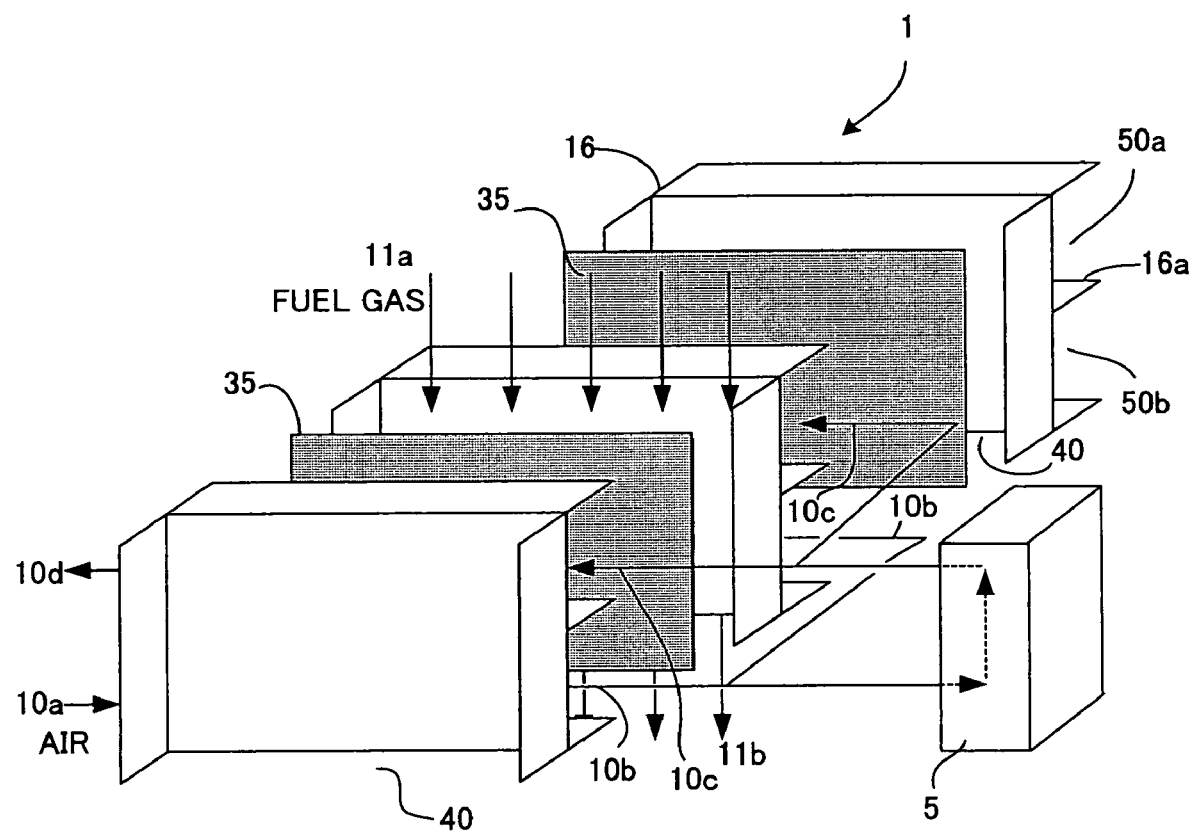
FIG. 1 is an exploded perspective view of a fuel cell stack according to a first embodiment.
Figure 2:
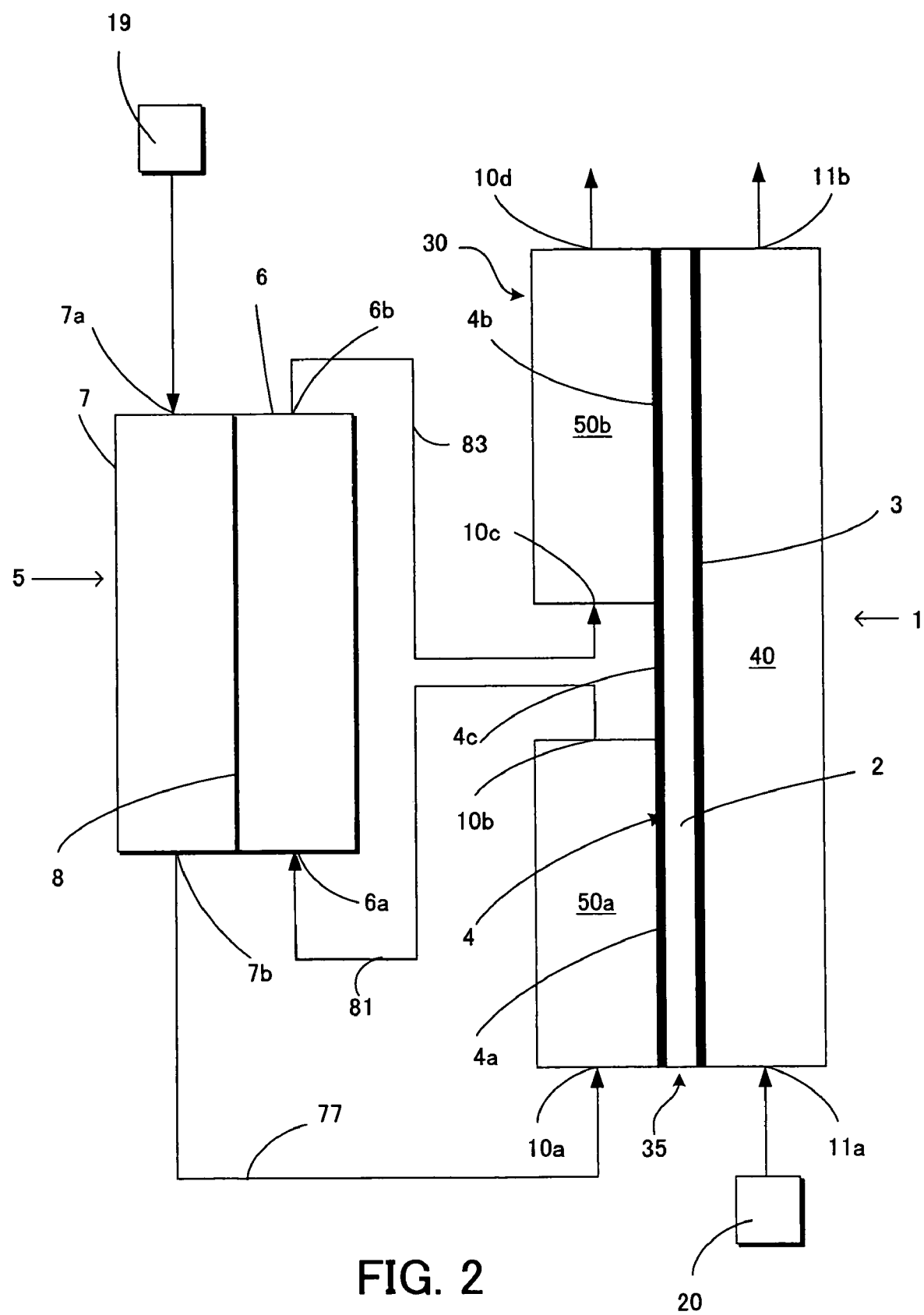
FIG. 2 is a schematic diagram of a fuel cell system comprising a humidity regulation module and a fuel cell stack according to the first embodiment.
Figure 3A:
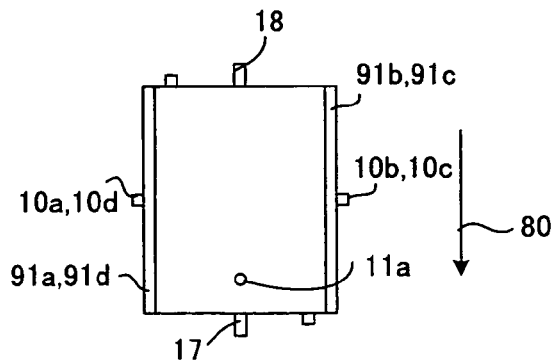
FIG. 3A is an upper view.
Figure 3B:
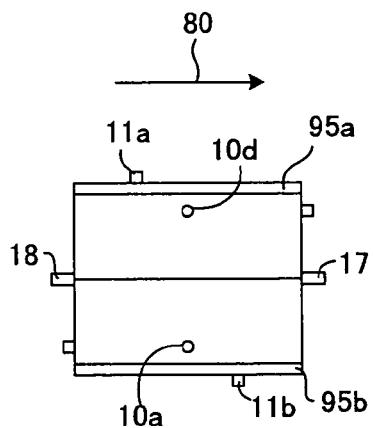
FIG. 3B is a left view.
Figure 3C:
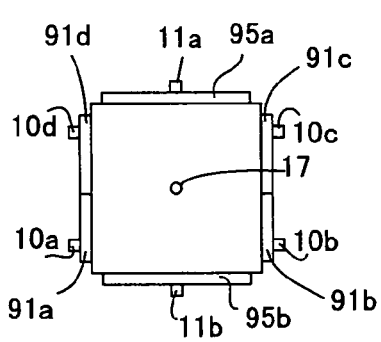
FIG. 3C is a front view.
Figure 3D:
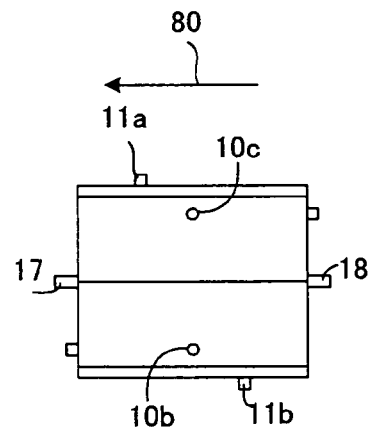
FIG. 3D is a right view and FIG. 3E is a bottom view. The arrow shows the direction of lamination in the fuel cell stack.
Figure 3E:
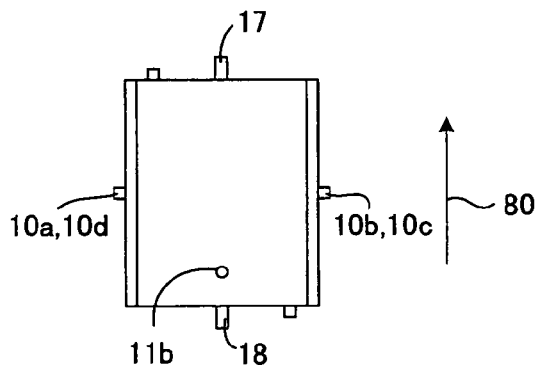

Referring to FIG. 1 and FIG. 2, a first embodiment of this invention will be described. The fuel cell stack 1 is a stack of solid polymer fuel cells. The fuel cell stack 1 comprises a plurality of unit cells 30 separated by a bipolar plate 16 (separator). The unit cell 30 is provided with a membrane electrode assembly (MEA) 35 which has a polymer electrolyte membrane 2, a fuel electrode 3 (in other words, hydrogen electrode) and an air electrode 4 (in other words, oxygen electrode). The fuel electrode 3 and the air electrode 4 sandwich the polymer electrolyte membrane 2 so that the polymer electrolyte membrane 2 is disposed between the fuel electrode 3 and the air electrode 3. Each electrode is a gas diffusion electrode provided with a thin platinum catalytic layer making contact with the polymer electrolyte membrane 2 and a porous gas diffusion layer on the outer side of the platinum catalytic layer.

Referring to FIG. 1, the fuel cell stack 1 is formed by alternate lamination of a MEA 35 and a bipolar plate 16. The section of the bipolar plate 16 in proximity to the air electrode 4 forms the upstream oxidant gas channel 50a and downstream oxidant gas channel 50b which are separated from each other. The upstream oxidant gas channel 50a and the downstream oxidant gas channel 50b are disposed in an adjacent parallel orientation. Precisely, the upstream oxidant gas channel 50a and the downstream oxidant gas channel 50b are separated by a plate 16a disposed in the central section of the bipolar plate 16 in proximity to the air electrode 4. The flow of air in the upstream oxidant gas channel 50a is in the opposite direction to the flow of air in the downstream oxidant gas channel 50b. Furthermore hydrogen supplied from the fuel gas supply inlet 11a flows through the fuel electrode 3 in an orthogonal orientation to the flow of air flowing through the upstream oxidant gas channel 50a and the downstream oxidant gas channel 50b, and is discharged from the fuel gas discharge outlet 11b.

FIG. 2 shows a fuel cell system having a fuel cell stack 1 and a humidifying-dehumidifying system. For the sake of simplicity, only a single unit cell 30 is shown in the fuel cell stack 1. Fuel gas containing hydrogen is supplied to the fuel electrode 3 through a fuel gas channel 40 (hydrogen gas channel) from a fuel gas supply device 20. Air is supplied as a gaseous oxidant to the air electrode 4 through the upstream oxidant gas channel 50a and the downstream oxidant gas channel 50b from an air supply device 19. The upstream oxidant gas channel 50a is positioned upstream of the downstream oxidant gas channel 50b relative to the flow of oxidant gas. The fuel cell stack 1 performs power generation operations as a result of the migration of protons in the polymer electrolyte membrane 2 from the fuel electrode 3 to the air electrode 4.

The unit cell 30 of the fuel cell stack 1 comprises an upstream air electrode 4a (first oxygen electrode) opposed to the upstream oxidant gas channel 50a (first oxidant gas channel) and a downstream air electrode 4b (second oxygen electrode) opposed to the downstream oxidant gas channel 50b (second oxidant gas channel). The air electrode 4 is divided into the upstream air electrode 4a and the downstream air electrode 4b with respect to a flow of supplied air. In this embodiment, the upstream air electrode 4a and the downstream air electrode 4b are physically connected. However the upstream air electrode 4a and the downstream air electrode 4b are functionally separated by the section 4c of the air electrode which is not supplied with oxygen resulting in the absence of electrochemical reactions. Therefore, the upstream air electrode 4a and the downstream air electrode 4b serve as respectively independent electrodes.

The fuel cell stack 1 is provided with a humidity regulation module which has a humid air passage 6 and a dry air passage 7. The air supplied from the air supply device 19 is introduced into the dry air passage 7. Air which is discharged from the dry air passage 7 is supplied to the upstream oxidant gas channel 50a through an air supply passage 77. Furthermore the air discharged from the upstream oxidant gas channel 50a is introduced into the humid air passage 6 through an air passage 81 and the air discharged from the humid air passage 6 is supplied to the downstream oxidant gas channel 50b through an air passage 83.

The fuel cell system is provided with a controller 15 for controlling auxiliary devices such as pumps or gas flow rate control valves in the fuel system. The controller 21 comprises a microprocessor provided with a central processing unit (CPU), a read-only memory (ROM), a random access memory (RAM) and an input/output interface (I/O interface).

The structure of the fuel cell stack 1 will be described referring to FIG. 3A-3E. The outer appearance of the fuel cell stack 11 is shown in FIG. 3A-3E. The arrow in FIG. 3A-3E shows the direction of lamination 80 in the fuel cell stack. In FIG. 3A-3E, air is supplied from the air supply inlet 10a to the upstream oxidant gas channel 50a and is discharged from the medial air outlet 10b. An air manifold 91a is connected between the air supply inlet 10a and the plurality of upstream oxidant gas channels 50a of the fuel cell stack 1 so as to distribute air to the plurality of upstream oxidant gas channels 50a. Similarly, an air manifold 91b is connected between the medial air outlet 10b and the plurality of upstream oxidant gas channels 50a of the fuel cell stack 1 so as to collect air from the plurality of upstream oxidant gas channels 50a. Thereafter the air is introduced into the downstream oxidant gas channel 50b from the medial air inlet 10c after passing through humidity regulation module 5. The oxygen in the air diffuses into the upstream air electrode 4a from the upstream oxidant gas channel 50a and into the downstream air electrode 4b from the downstream oxygen gas channel 50b. After passing through the downstream air electrode 4b, the air is discharged from the air discharge outlet 10d. An air manifold 91c is connected between the medial air inlet 10c and the plurality of downstream oxidant gas channels 50b of the fuel cell stack 1 so as to distribute air to the plurality of downstream oxidant gas channels 50b. Similarly, an air manifold 91d is connected between the air discharge outlet 10d and the plurality of downstream oxidant gas channels 50b of the fuel cell stack 1 so as to collect air from the plurality of downstream oxidant gas channels 50b.

On the other hand, fuel gas from the fuel gas supply inlet 11a is introduced into the fuel electrode 3. The fuel gas is discharged from the fuel gas discharge outlet 11b after hydrogen contained therein is used in power generation operations. A fuel gas manifold 95a is connected between the fuel gas supply inlet 11a and the plurality of fuel gas channels 40 of the fuel cell stack 1 so as to distribute fuel gas to the plurality of fuel gas channels 40. Similarly, a fuel gas manifold 95b is connected between the fuel gas discharge outlet 11b and the plurality of fuel gas channels 40 of the fuel cell stack 1 so as to collect fuel gas from the plurality of fuel gas channels 40. The direction of flow of the fuel gas in the fuel electrode 3 is orthogonal to the direction of airflow in the air electrode 4.

During power generation operations, protons can migrate in the electrolyte membrane 2 as a result of conversion into hydrated protons. For this reason, it is necessary to maintain the humidity characteristics of the polymer electrolyte membrane 2. There is a known method of humidifying at least one of the air and the fuel gas. At the air electrode 4 of the fuel cell stack 1, two moles of water are produced for each mole of oxygen consumed as shown by the reaction ($1/2O_2+2H^++2e- \rightarrow H_2O$). The humidity regulation module 5 can use water produced by the air electrode 4 in order to humidify air to be supplied to the air electrode 4 before it is introduced into the fuel cell stack 1.

Figure 4:
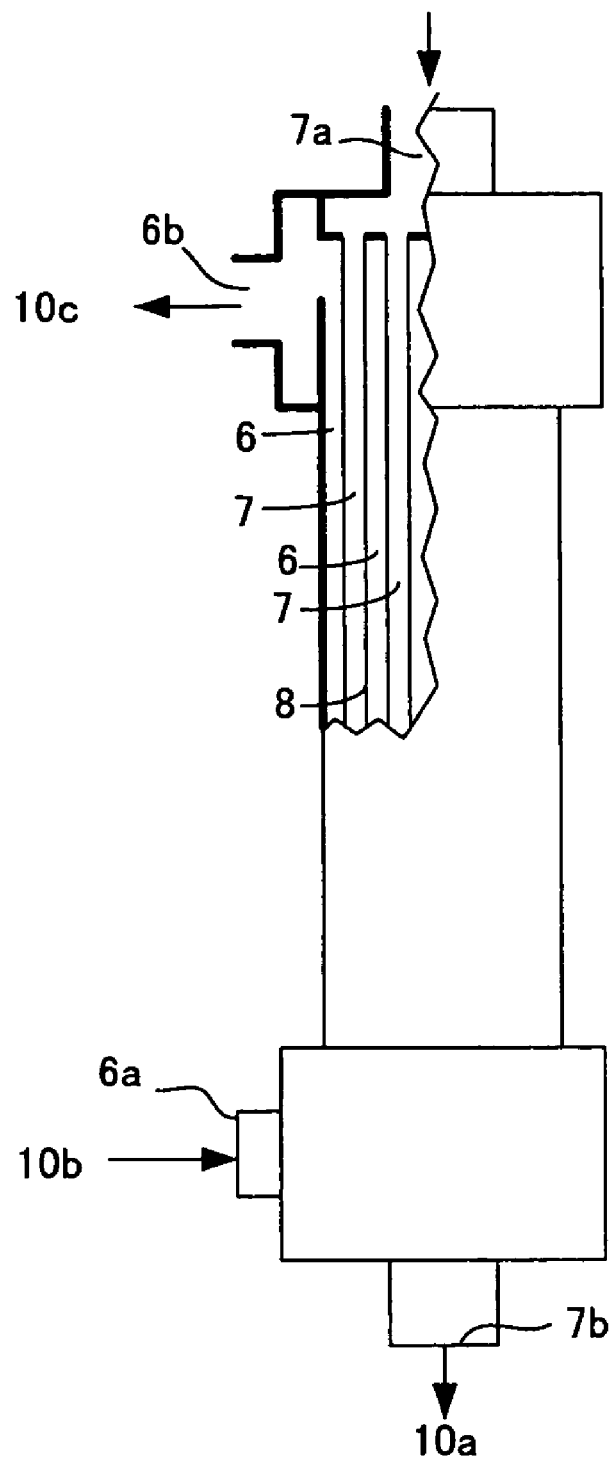
FIG. 4 is a partially cross sectional and broken view of the humidity regulation module according to the first embodiment.

FIG. 4 is a schematic diagram showing the humidity regulation module 5. In the humidity regulation module 5, a plurality of humid air passages 6 are alternated in parallel to a plurality of dry air passages 7. A water permeable membrane 8 allowing selective permeation of water is disposed between the humid air passage 6 and the dry air passage 7 so as to separate the humid air passage 6 and the dry air passage 7. Air used in power generation operations, in other words, air to be supplied to the air electrode 4 flows through the dry air passage 7. Air discharged from the upstream oxidant gas channel 50a through the medial air outlet 10b flows to the humid air passage 6. The water permeable membrane 8 and the humid air passage 6 constitute a dehumidifier for dehumidifying the air which has passed through the upstream oxidant gas channel 50a. In contrast, the water permeable membrane 8 and the dry air passage 7 constitute a humidifier for humidifying air to be supplied to the upstream oxidant gas channel 50a. The respective air inlets are disposed on the fuel cell stack 1 so that the direction of flow of air in the dry air passage 7 is opposite to the direction of flow of air in the humid air passage 6.

Referring to FIG. 5A-5E, the assembly 60 of the fuel cell stack 1 and the humidity regulation module 5 will be described. The arrow in FIG. 5A-5E shows the direction of lamination 80 in the fuel cell stack. The air supply device 19 is connected by a pipe to the inlet 7a of the dry air passage 7. Similarly, the air supply inlet 10a for the upstream air electrode 4a is connected by a pipe used as the air supply passage 77 to the outlet 7b of the dry air passage 7. Furthermore the inlet 6a of the humid air passage 6 is connected to the medial air outlet 10b for the upstream air electrode 4a through a pipe used as the air passage 81. The medial air inlet 10c and the outlet 6b of the humid air passage 6 are connected by a pipe used as the air passage 83.

Figure 6A:
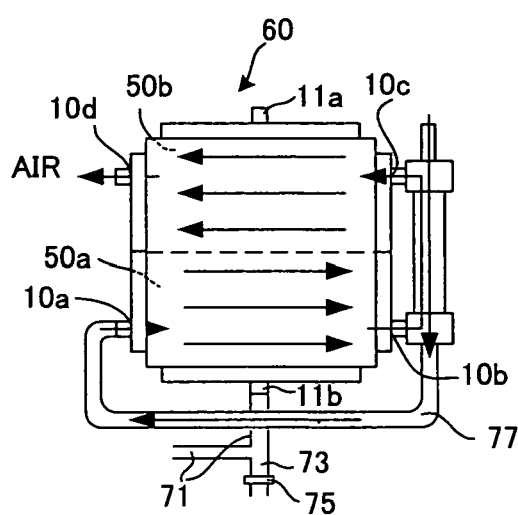
FIG. 6A is a sectional view orthogonal to the direction of lamination and showing the flow of air.
Figure 6B:
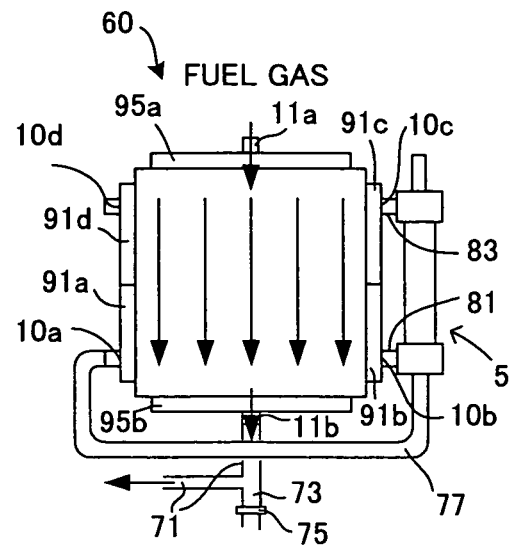
FIG. 6B is a sectional view orthogonal to the direction of lamination and showing the flow of fuel gas.

Referring to FIG. 6A, air passes in sequence through the dry air passage 7, the upstream oxidant gas channel 50a opposed to the upstream air electrode 4a, the humid air passage 6 and the downstream oxidant gas channel 50b opposed to the downstream air electrode 4b. Air flows in a substantially horizontal direction in the upstream and downstream oxidant gas channels 50a, 50b. Referring to FIG. 6B, in the fuel cell stack 1, fuel gas flows orthogonal with respect to the flow of air and in a substantially vertically downward direction. The fuel gas flow in a substantially vertically downward direction readily transfers water on the fuel electrode 3 to a water drain passage 73 extending from the fuel gas discharge passage 71, with the assistance of gravity. (Water is usually present on the fuel electrode 3 because of osmosis of water from the air electrodes 4a, 4b to fuel electrode 3.) If fuel gas flows in a vertically upward direction, the fuel gas blows off the water accumulated in the water drain passage 73 above a drain valve 75. Further, the upstream oxidant gas channel 50a is positioned on the downstream side with respect to the flow of the fuel gas and below the downstream oxidant gas channel 50b. Oppositely, the downstream oxidant gas channel 50b is positioned on the upstream side with respect to the flow of the fuel gas and above the upstream oxidant gas channel 50a. This configuration can promote a homogeneous power generation in the MEA 35 by compensating for the difficulty of generating power on the downstream side of the fuel electrode 3 and on the downstream air electrode 4b. Power generation using fuel gas is relatively impeded on the downstream side with respect to the fuel gas flow because the fuel gas is consumed while flowing through the fuel electrode 3. Power generation using oxygen is relatively impeded on the downstream air electrode 4b because the oxygen amount is lower on the downstream air electrode 4b than on the upstream air electrode 4a.

Figure 6C:
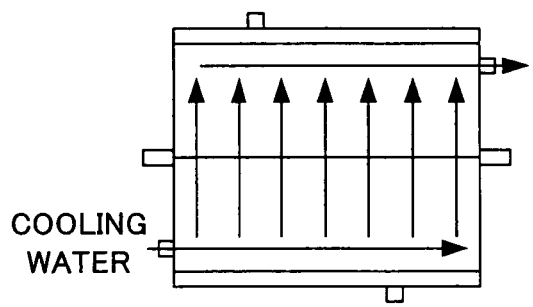
FIG. 6C is a sectional view of the direction of lamination showing the flow of cooling water.
Figure 6D:
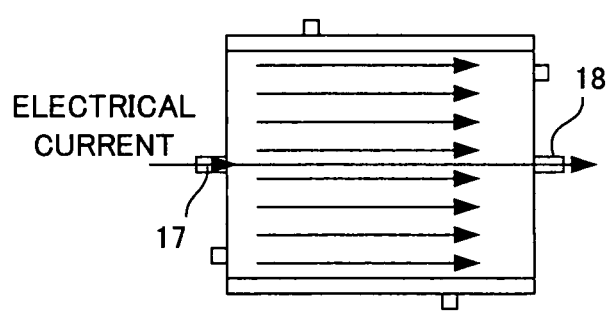
FIG. 6D is a sectional view of the direction of lamination showing the flow of electrical current.

Referring to FIG. 6C, cooling water flows in the opposite direction to the flow of fuel gas. Referring to FIG. 6D, electrical current flows in the direction of lamination in the fuel cell stack 1 and is collected to the positive terminal 17 and negative terminal 18. An electrical circuit is connected to the positive terminal 17 and negative terminal 18 provided on both ends of the fuel cell stack 1 in order to extract electrical power.

Air supplied to the humid air passage 6 contains moisture supplied as a result of humidifying air in the humidity regulation module 5 as well as moisture (water) produced at the upstream air electrode 4a. A portion of the moisture in the air flowing through the humid air passage 6 migrates towards the dry air passage 7 through the water permeable membrane 8 and humidifies air flowing through the dry air passage 7.

Referring to FIG. 7, the spatial variation in the oxygen amount and the moisture in the air along the air electrode 4 of the fuel cell stack 1 according to the first embodiment will be described. For the purposes of comparison, FIG. 8 shows the spatial variation in the oxygen amount and the moisture in the air along the air electrode in a prior-art fuel cell system. In the prior-art fuel cell system, the air electrode 4 is not divided and dehumidifying operations are not performed on air flowing through the fuel cell stack 1. In the prior-art fuel cell system, moisture contained in air after it has completely flowed through the fuel cell stack 1 is removed and used in humidifying operations.

Figure 8A:
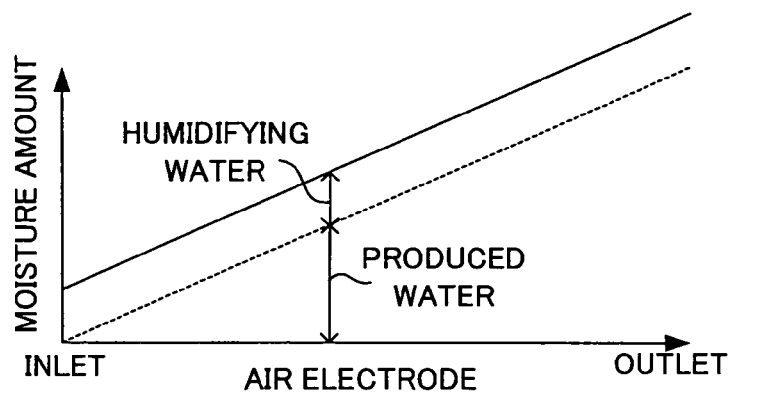
FIG. 8A-8D are graphs respectively showing the spatial variation along the flow of air with respect to the amount of moisture, the amount of oxygen, the molar fraction of moisture, and the molar fraction of oxygen in the air according to a prior-art example.
Figure 8B:
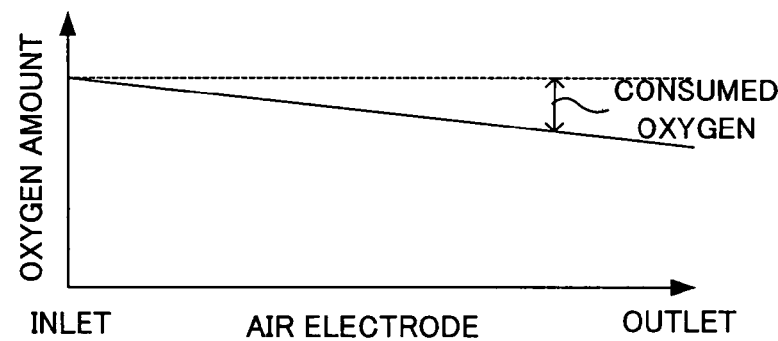
Figure 8C:
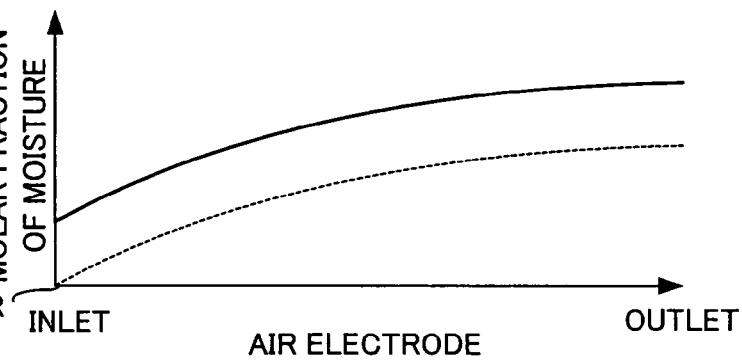
Figure 8D:
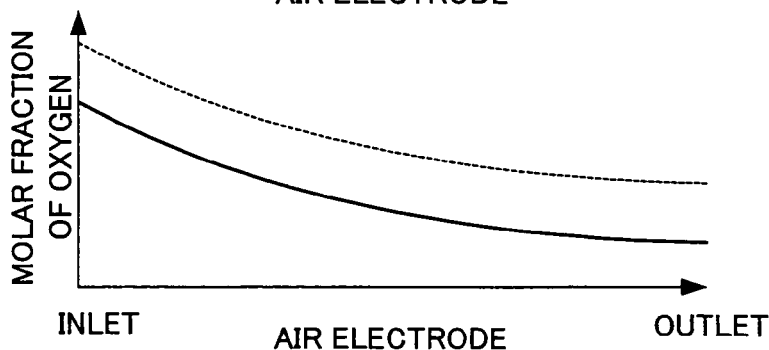

Referring to FIG. 8A-8E, a prior-art technique will be described. As shown in FIG. 8A, the moisture amount (water amount) increases according to the flow of air. In contrast, since the oxygen in the air is consumed by power generation reactions, as shown in FIG. 8B, the oxygen amount is reduced along the direction of airflow. As shown in FIG. 8C, the molar fraction of moisture (or partial vapor pressure) increases downstream. Thus in downstream sections of the air electrode, power generation using oxygen is difficult.

Figure 7A:
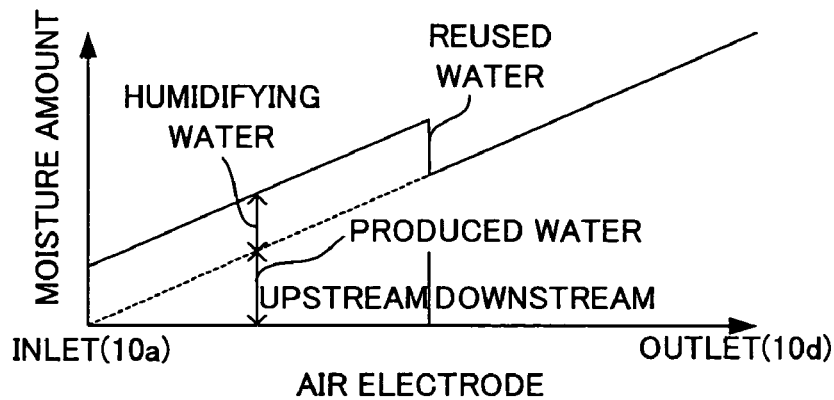
FIG. 7A-7D are graphs respectively showing the spatial variation along the flow of air with respect to the amount of oxygen and the moisture, the molar fraction of moisture, and the molar fraction of oxygen in the air according to the first embodiment.
Figure 7B:
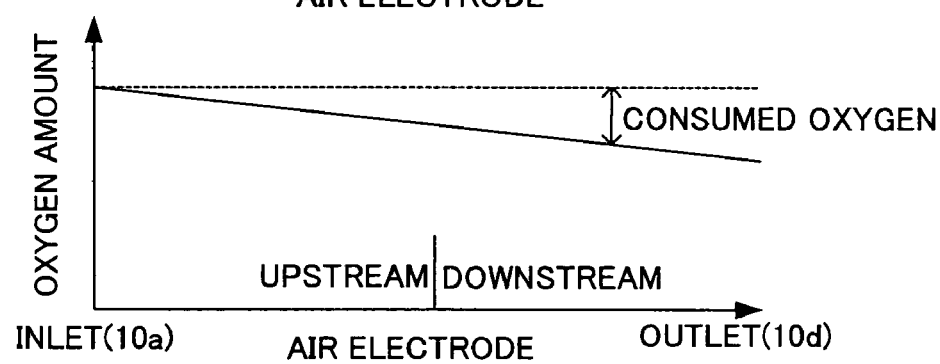
Figure 7C:
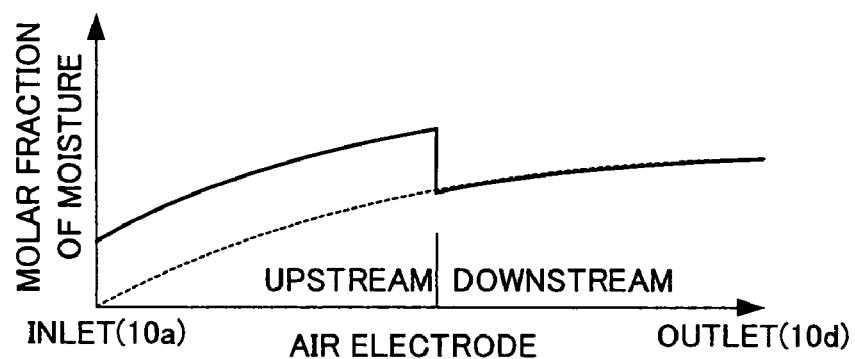

In contrast, in the first embodiment of this invention, the air electrode 4 is divided into the upstream air electrode 4a and the downstream air electrode 4b. The humidity regulation module 5 performs dehumidifying operations on air between the upstream oxidant gas channel 50a for supplying air to the upstream air electrode 4a and the downstream oxidant gas channel 50b for supplying air to the upstream air electrode 4b. Referring to FIG. 7A and FIG. 7C, on the border of the upstream air electrode 4a and the downstream air electrode 4b, the moisture amount in the air falls by an amount corresponding to the moisture amount reduction which is the moisture amount shifting from the humid air passage 6 to the dry air passage 7. Furthermore as shown in FIG. 7B, the oxygen amount in the air is reduced as the air approaches the air discharge outlet 10d (also refer to FIG. 8B).

As shown in FIG. 7C, the molar fraction of moisture in the air decreases between the upstream air electrode 4a and the downstream air electrode 4b. After this decrease, the molar fraction of moisture in the air increases as the air re-approaches the air discharge outlet 10d. The molar fraction of moisture in the air in proximity to the air discharge outlet 10d is small in comparison to that shown in FIG. 8C. Only moisture produced as a result of power generation operations is contained in the air in proximity to the outlet of the downstream oxidant gas channel 50b.

Figure 7D:
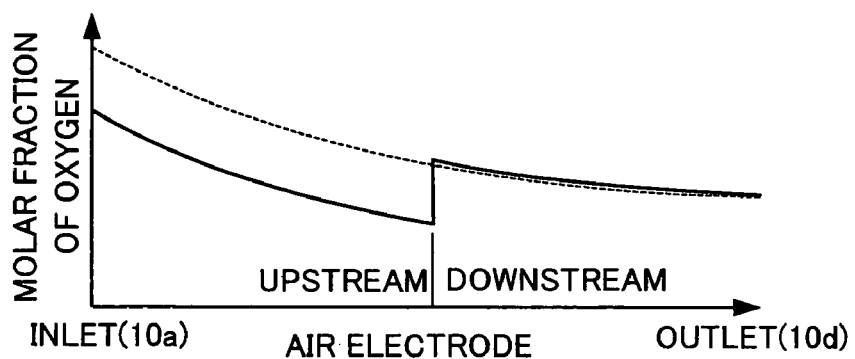

Referring to FIG. 7D, the molar fraction of oxygen in the air increases as the amount of moisture decreases. In other words, after the molar fraction of oxygen increases between the upstream air electrode 4a and the downstream air electrode 4b, it starts to decrease again. However in proximity to the outlet of the air electrode 4, the molar fraction of oxygen in the air is a large value in comparison to that shown in FIG. 8D.

As shown in FIG. 7A, the moisture added during humidifying operations is reused since it moves from the humid air passage 6 to the dry air passage 7. In this manner, since the air discharged from the dry air passage 7 is humidified by the reused water, it is possible perform highly efficient power generation operations in the upstream air electrode 4a.

The effect of this embodiment will be described below. The air electrode 4 is divided into at least two sections and air is supplied to the upstream air electrode 4a and to the downstream air electrode 4b. After a portion of the water contained in the air discharged from the upstream air electrode 4a is removed, the air is supplied to the downstream air electrode 4b. In this manner, it is possible to avoid a reduction in the partial pressure of oxygen in proximity to the air discharge outlet of the air electrode 4. Consequently it is possible to improve power generation efficiency. In addition it is possible to suppress flooding as a result of the excess condensation of water in proximity to the air discharge outlet 10d of the air electrode 4.

Power generation operations can be promoted by shifting a portion of the water removed from the air which has passed through the upstream oxidant gas channel 50a into the air to be supplied to the upstream air electrode 4a. In this manner, it is possible to improve the efficiency of water use.

The fuel cell assembly is provided with a humidity regulation module 5 which allows water to move from the humid air passage 6 to the dry air passage 7. The air which is scheduled to be supplied to the air electrode 4 passes through the dry air passage 7. The air discharged from the upstream air electrode 4a passes through the humid air passage 6 and then is supplied to the downstream air electrode 4b. In this manner, it is possible to supply water in the air discharged from the upstream air electrode 4a to the air to be supplied to the upstream air electrode 4a.

When the flow rate of air introduced from the air supply device 19 is fixed, moisture supplied for humidifying operations upstream of the upstream air electrode 4a is removed from the air discharged from the upstream air electrode 4a.

Since it is possible to suppress the amount of moisture contained in the air supplied to the downstream air electrode 4b, it is possible to suppress flooding which tends to occur in the downstream air electrode 4b.

Figure 9:
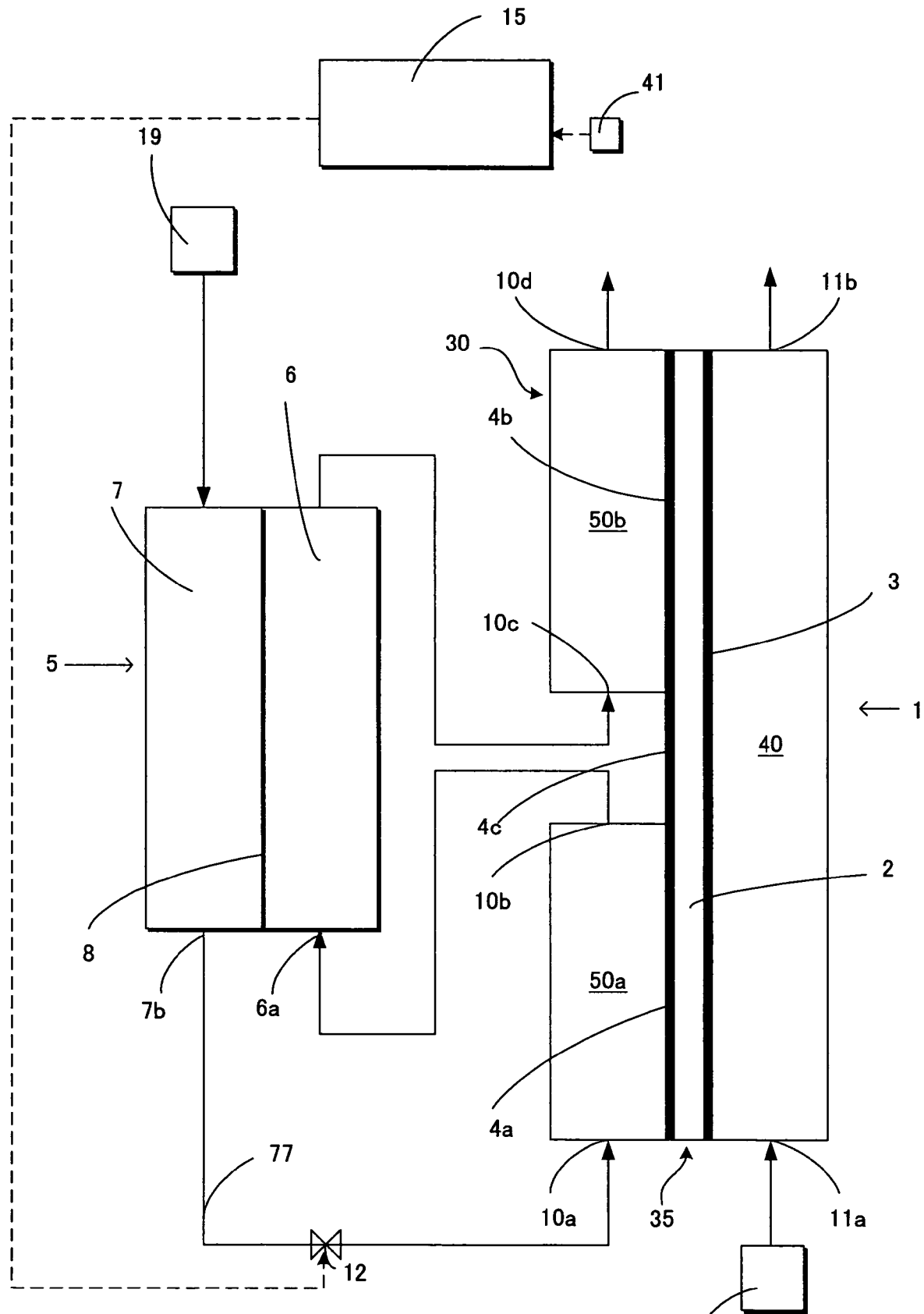
FIG. 9 is a schematic diagram of a fuel cell system having a humidity regulation module and a fuel cell stack according to a second embodiment.

Referring to FIG. 9, a second embodiment of the invention will be described. FIG. 9 shows the structure of the humidifying system and the fuel cell stack 1 according to the second embodiment. For the sake of simplicity, only a single unit cell 30 is shown in the fuel cell stack 1.

In the second embodiment, a pressure regulation valve 12 which regulates air pressure is provided between an inlet 6a of the humid air passage 6 and an outlet 7b of the dry air passage 7. Preferably, the pressure regulation valve 12 is provided in the air supply passage 77 which connects the air supply inlet 10a of the upstream air electrode 4a with the outlet 7b of the dry air passage 7. The pressure regulation valve 12 may be provided upstream of the medial air outlet 10b and downstream of the outlet 7b of the dry air passage 7. The fuel cell stack 1 and the humidity regulation module 5 are the same as the components used in the first embodiment. The controller 15 controls the opening of the pressure regulation valve 12 in response to the power required for the fuel cell stack 1.

Figure 10:
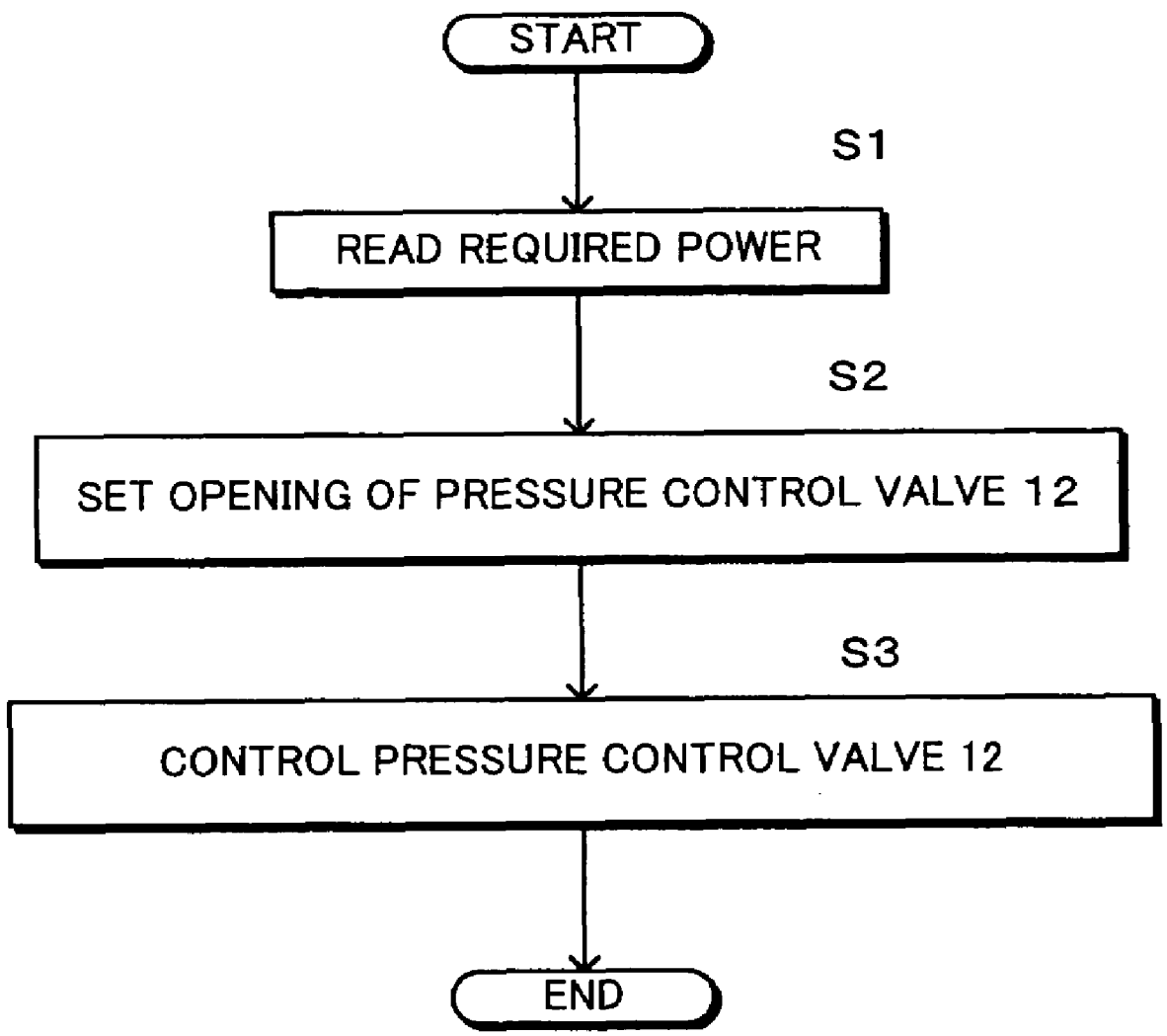
FIG. 10 is a flowchart showing a control routine executed by a controller according to the second embodiment.

Referring to the flowchart in FIG. 10, the control routine for the pressure regulation valve 12 which is executed by the controller 15 will be described.

Firstly in a step S1, the power required for the fuel cell stack 1 is read. When the fuel cell system used in order to drive a vehicle for example, the vehicle accelerator functions as a sensor 41 for detecting the required power and the required power corresponds to the depression amount of the vehicle accelerator. In a step S2, the opening of the pressure regulation valve 12 is set in response to the required power read in the step S1. The setting of the opening is performed by looking up a map as shown in FIG. 11 which is obtained from experimentation and stored in the ROM of the controller 15.

Figure 11:
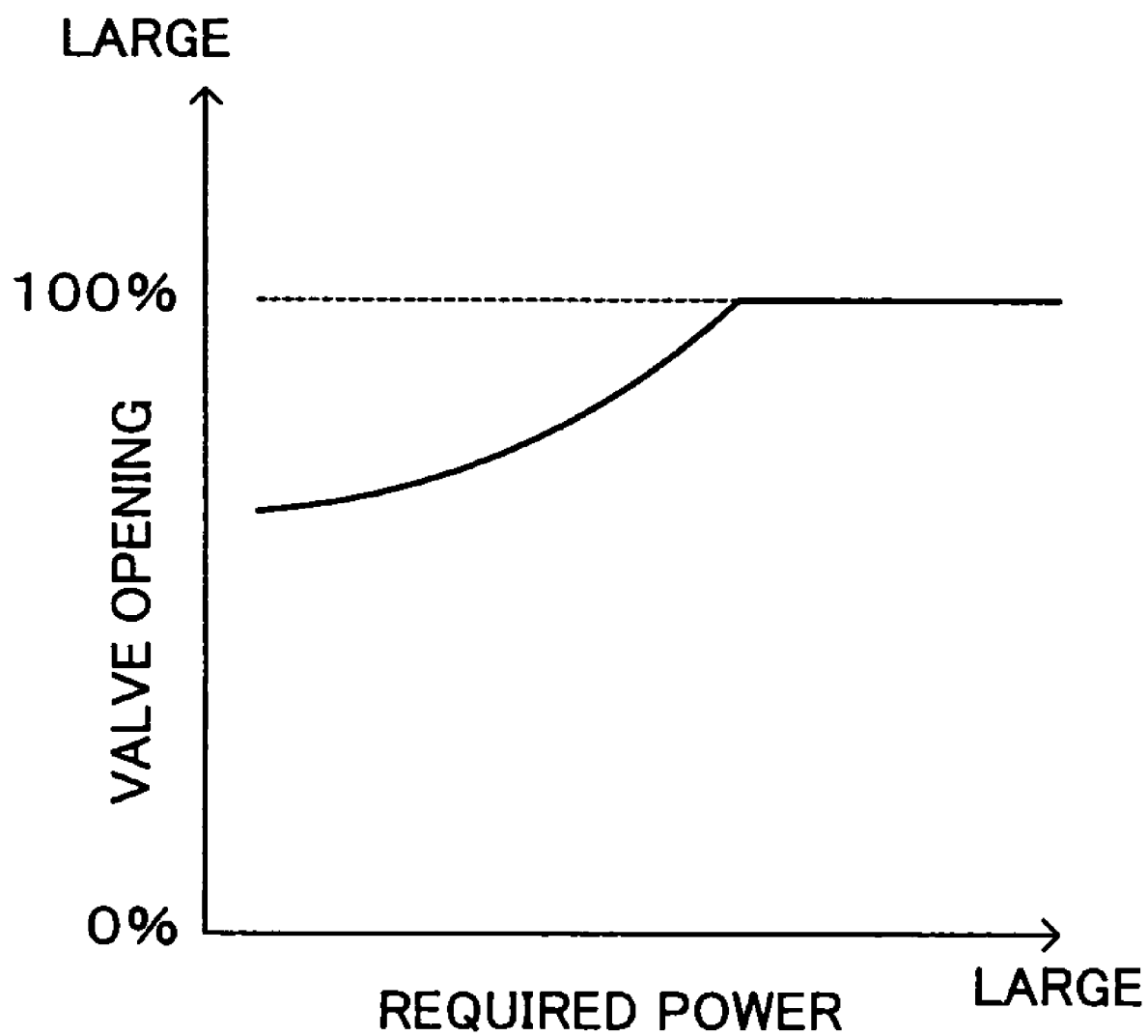
FIG. 11 is a map showing the relation between the opening of a pressure regulation valve and a required power according to the second embodiment.

The map shown in FIG. 11 shows the relationship between the opening of the pressure regulation valve 12 and the required power. At low levels of power generation, the amount of water produced in the downstream air electrode 4b is low and the required humidifying amount for air to be supplied to the upstream air electrode 4a is also low. Consequently at low levels of power generation, the humidifying amount in the humidity regulation module 5 is decreased by reducing the opening of the pressure regulation valve 12. The pressure in the humid air passage 6 to the air electrode 4 is further reduced by closing the pressure regulation valve 12. As a result, the amount of water moving from the humid air passage 6 to the dry air passage 7 is reduced. In contrast, at high levels of power generation, the amount of water produced in the downstream air electrode 4b is large and the amount of water in the upstream air electrode 4a is also large. As a result, at high levels of power generation, the amount water moving from the humid air passage 6 to the dry air passage 7 in the humidity regulation module 5 is increased by enlarging the opening of the pressure regulation valve 12 in comparison to the opening at low levels of power generation.

In a step S3, the pressure regulation valve 12 is controlled in order to realize the opening for the pressure regulation valve 12 set in the step S2. The control routine above may be repeated at a fixed interval or may be executed when the required power is varied.

The effect of the second embodiment will be described below. A pressure regulation valve 12 is disposed between the outlet 7b of the dry air passage 7 and the inlet 6a of the humid air passage 6. The pressure in the humid air passage 6 and the dry air passage 7 is regulated by regulating the pressure regulation valve 12. In this manner, the amount of water movement (amount of reused water) in the humidity regulation module 5 can be regulated.

Figure 12:
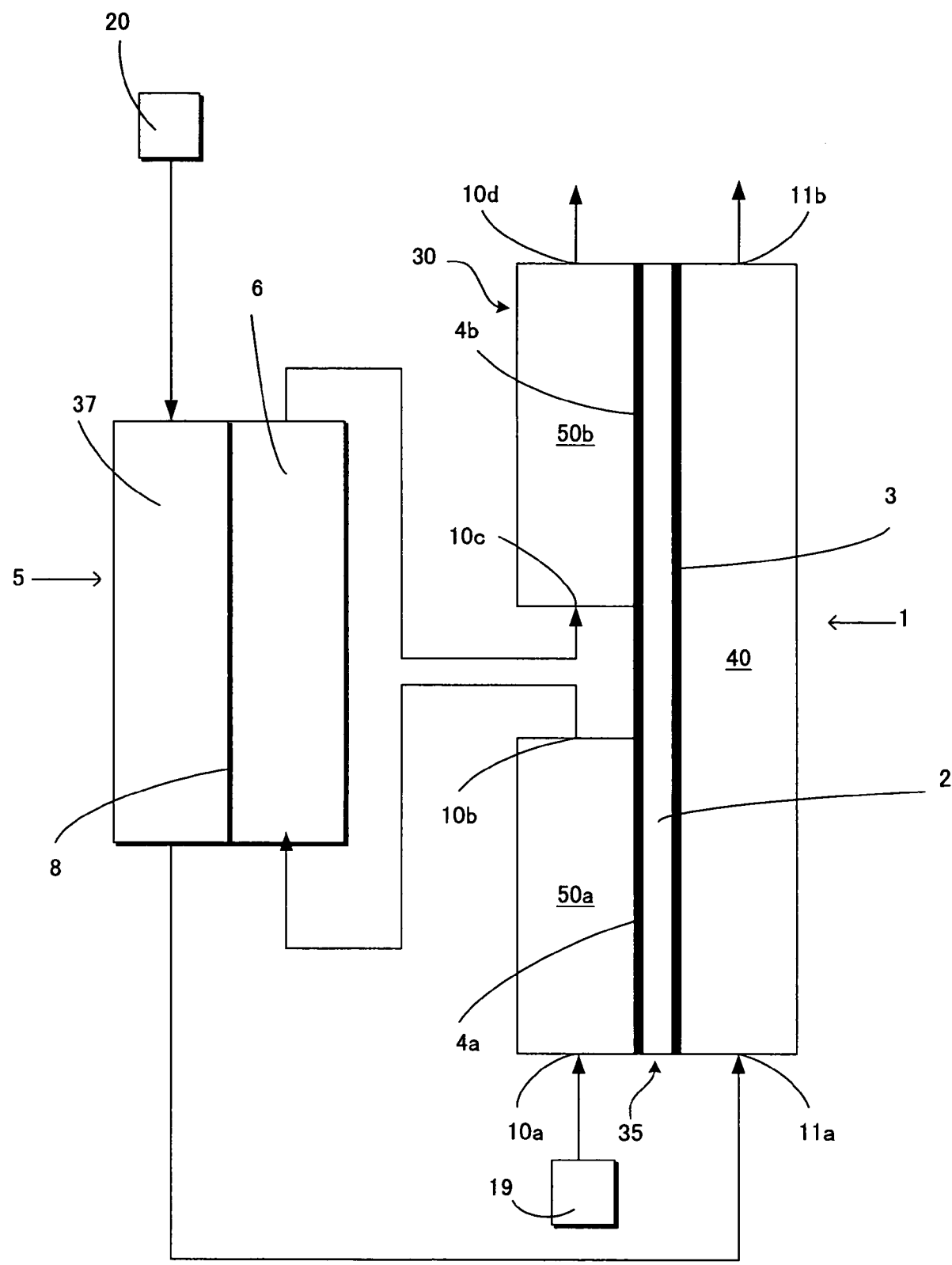
FIG. 12 is a schematic diagram of a fuel cell system having a humidity regulation module and a fuel cell stack according to a third embodiment.

Referring to FIG. 12, a third embodiment of this invention will be described. For the sake of simplicity, only a single unit cell 30 is shown in the fuel cell stack 1 of FIG. 12. In the humidity regulation module 5 according to the third embodiment, a dry fuel gas passage 37 is provided instead of the dry air passage 7 according to the first embodiment. Fuel gas is introduced into the dry fuel gas passage 37 from the fuel gas supply device 20 and is humidified by water moving from the humid air passage 6 to the dry fuel gas passage 37. Thereafter humidified fuel gas is supplied to the fuel gas supply inlet 1 la of the fuel gas channel 40. In this manner, a portion of the water removed from the air discharged from the upstream oxidant gas channel 50a is supplied to the dry fuel gas passage 37 through the water permeable membrane 8. In contrast, air is supplied directly from the air supply device 19 to the upstream oxidant gas channel 50a. Other features are the same as those described with respect to the first embodiment.

Figure 13:
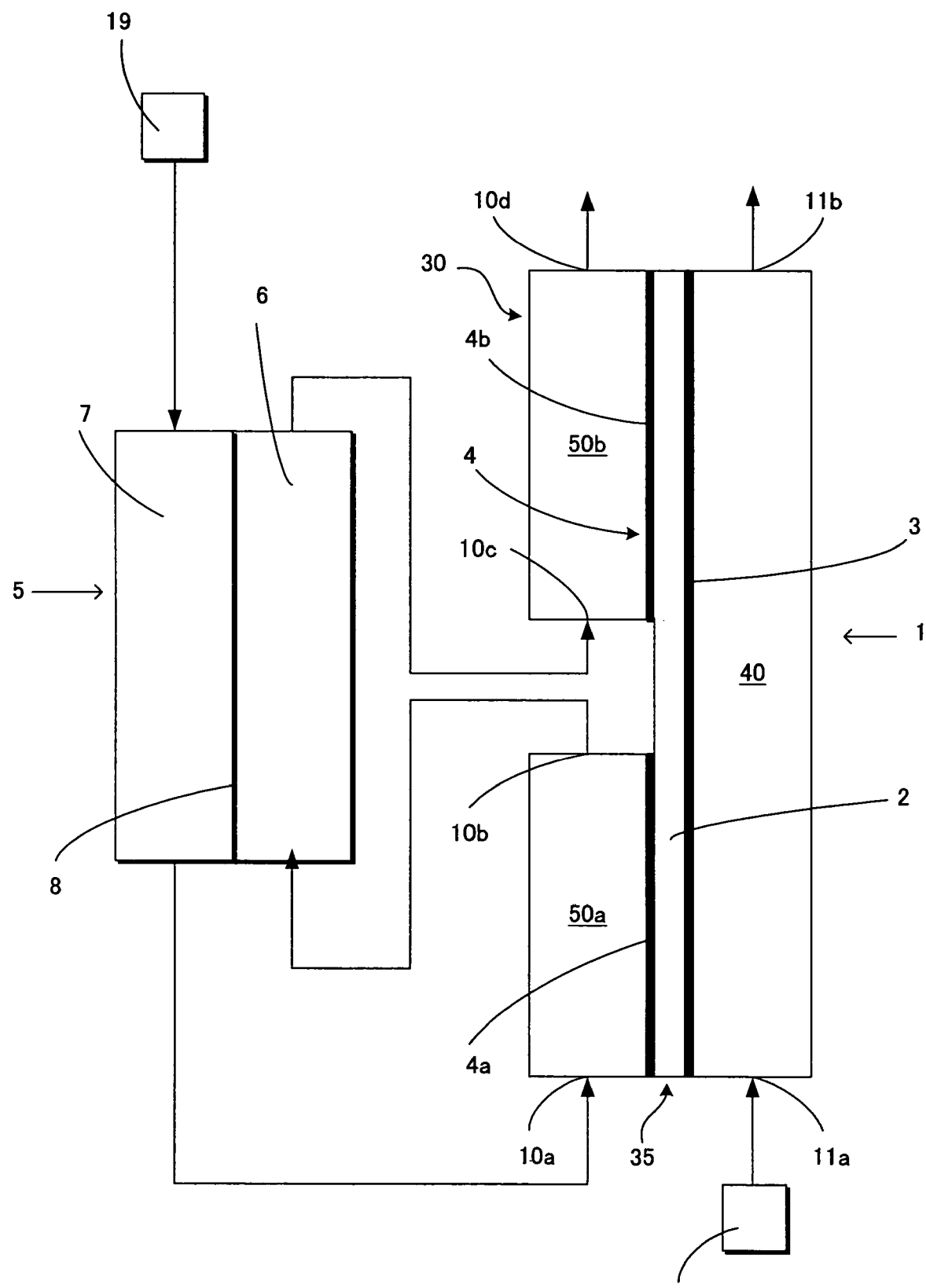
FIG. 13 is a schematic diagram of a fuel cell system having a humidity regulation module and a fuel cell stack according to a fourth embodiment.

Referring to FIG. 13, a fourth embodiment of this invention will be described. For the sake of simplicity, only a single unit cell 30 is shown in the fuel cell stack 1 of FIG. 13. In the fourth embodiment, the upstream air electrode 4a (first oxygen electrode) and the downstream air electrode 4b (second oxygen electrode) are physically separated. The upstream air electrode 4a and the downstream air electrode 4b serve as respectively independent electrodes. Oxygen is supplied from the upstream oxidant gas channel 50a to the upstream air electrode 4a and from the downstream oxidant gas channel 50b to the downstream air electrode 4b. Other features of structures are the same as those described referring to the first embodiment.

Figure 14:
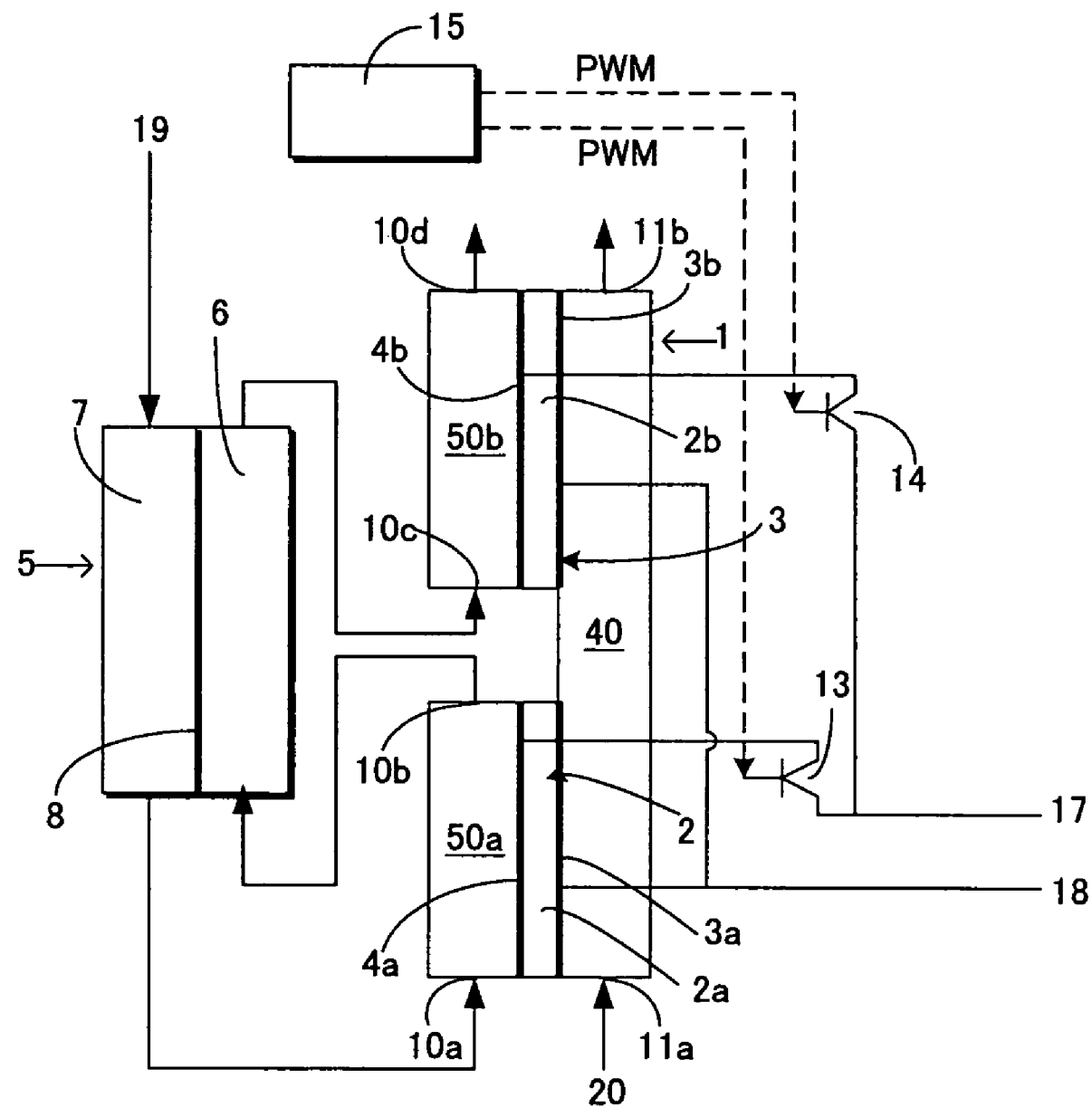
FIG. 14 is a schematic diagram of a fuel cell system having a humidity regulation module and a fuel cell stack according to a fifth embodiment.

Referring to FIG. 14, the structure of the humidifying system and the fuel cell stack 1 according to a fifth embodiment will be described. For the sake of simplicity, only a single unit cell 30 is shown in the fuel cell stack 1 of FIG. 14.

The polymer electrolyte membrane 2 is physically separated into a first portion 2a and a second portion 2b. The fuel electrode 3 is also physically separated into a first portion 3a and a second portion 3b.

A power regulation element 13 for regulating the power (upstream power) extracted from the upstream air electrode 4a and a power regulation element 14 for regulating the power (downstream power) extracted from the downstream air electrode 4b are provided. The power regulation elements 13, 14 comprise transistors such as an Insulated Gate Bipolar Transistor. The upstream air electrode 4a is electrically connected to a first power regulation element 13 and the downstream air electrode 4b is electrically connected to a second power regulation element 14. The power regulation elements 13, 14 are electrically connected to the positive terminal 17. The first portion 3a and the second portion 3b are directly connected to the negative terminal 18.

In this manner, the controller 15 performs independent control of the upstream power and the downstream power by regulating a PWM signal transmitted to the gate of the power regulation element 13, 14. For example, the controller 15 suppresses the downstream power to a smaller value than the upstream power, thereby reducing the amount of water produced in the downstream air electrode 4b to prevent flooding which tends to occur downstream.

The upstream air electrode 4a and the downstream air electrode 4b in the fuel cell stack 1 are electrically connected after passing through respective power regulation elements 13, 14. Thus it is possible to perform independent control of the upstream and downstream power in the fuel cell and to regulate the amount of water produced in the downstream air electrode 4b.

Referring to FIG. 15-17, the assembly 60 of the fuel cell stack and the humidity regulation module according to a sixth embodiment will be described. The sixth embodiment differs from the first embodiment in that the humidity regulation module is directly connected to a side surface 130 of the fuel cell stack 1 which is substantially parallel to the direction of lamination and is integrated with the air manifolds 91b, 91c shown in FIGS. 3-6. In this embodiment, the humidity regulation module 105 serves as an air manifold for collecting air from the plurality of upstream oxidant gas channels 50a and distributing air to the plurality of downstream oxidant gas channels 50b, while allowing movement of water from a humid air passage thereof to a dry air passage thereof. It should be noted that pipes used as the air passages 81, 83 are omitted resulting in both a cost reduction and improved structural strength in the assembly 60.

Figure 15A:
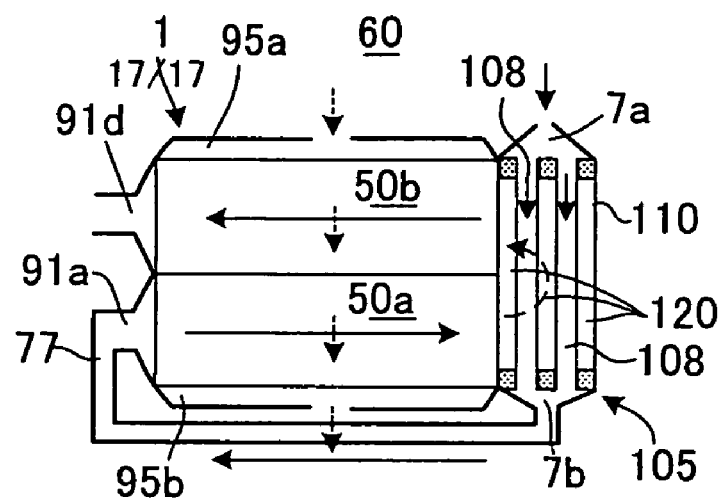
FIG. 15A-15C is a schematic sectional view of an assembly of a humidity regulation module and a fuel cell stack according to a sixth embodiment.
Figure 15B:
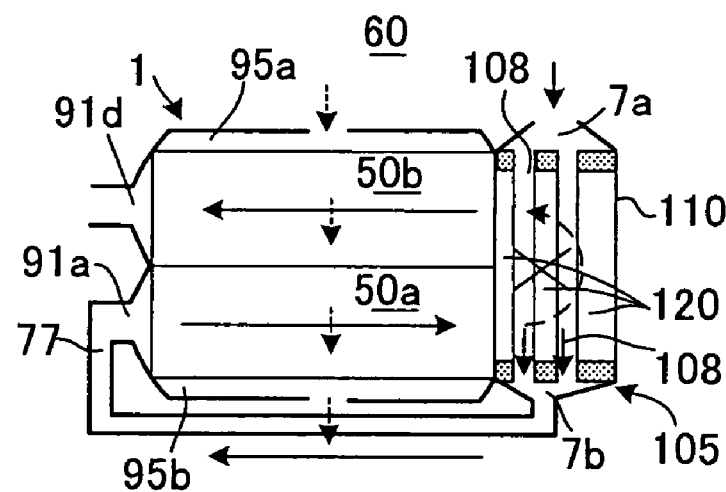
Figure 15C:
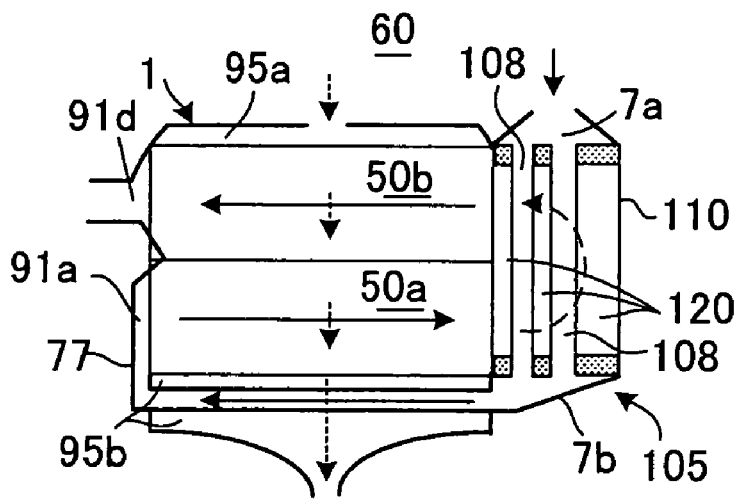
Figure 17A:
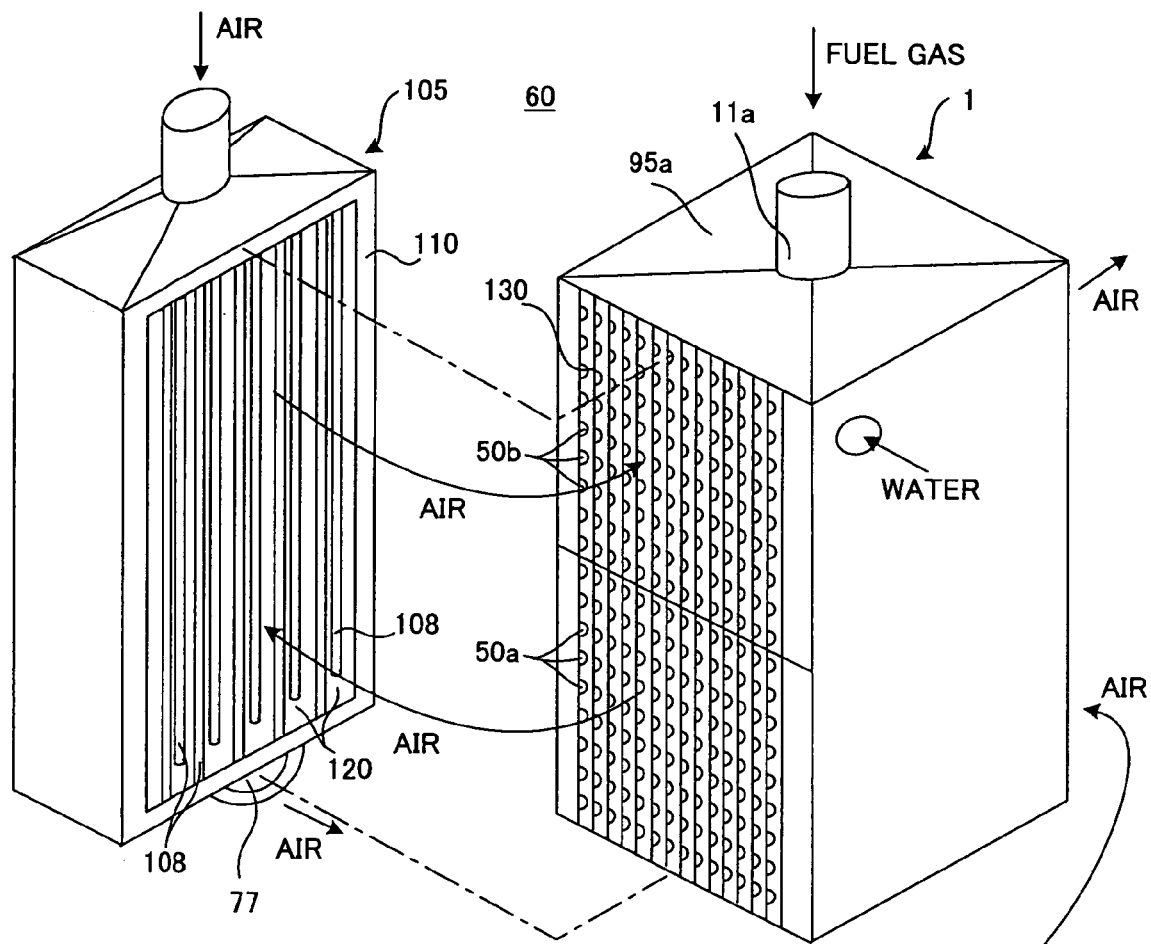
FIG. 17A is an exploded perspective view of the assembly shown in FIG. 15C.

Referring to FIG. 15A-15C, the humidity regulation module 105 comprises a plurality of hollow fiber membranes 108 each of which forms a dry air passage in its hollow section and a housing 110 which forms a humid air passage inside. The hollow fiber membranes 108 is provided in the housing 110, and thus the humid air passage is a space 120 formed between the housing 110 and the hollow fiber membranes 108 as well as between the hollow fiber membranes 108. Unlike the first embodiment, the humid air passage of the space 120 is directly connected to the upstream and downstream oxidant gas channels 50a, 50b. Air discharged from the upstream oxidant gas channels 50a is directly introduced into the space 120 and is dehumidified by the selective permeation of water through the hollow fiber membranes 108 from the humid air passage of the space 120 to the dry air passage inside the hollow fiber membranes 108. Then, the dehumidified air is discharged from the humid air passage of the space 120 into the downstream oxidant gas channels 50b. Thus, the humidity regulation module 105 turns the flow direction of air from the upstream oxidant gas channels 50a to the downstream oxidant gas channels 50b. For the sake of clarity, FIGS. 16A and 17A show an exploded perspective view of the assembly 60 comprising the fuel cell stack 1 and the humidity regulation module 105.

As shown in FIG. 15A, the hollow fiber membranes 108 may be evenly distributed in the housing 110 with a substantially constant density. In this case, since air flows mainly near the fuel cell stack 1 in the humid air passage of the space 120, the humidifying efficiency of the hollow fiber membranes 108 decreases as the distance from the fuel cell stack 1 increases. Therefore, as shown in FIGS. 15B and 16B, the hollow fiber membranes 108 may be unevenly distributed in the housing 110 with the density of the hollow fiber membranes 108 decreasing away from the fuel cell stack 1 if the size of the humidity regulation module 105 is allowed to be enlarged from that of FIG. 15A. In this case, air can flow sufficiently on the distal side away from the fuel cell stack 1 because the space between the hollow fiber membranes 108 is enlarged on the distal side.

Figure 17B:
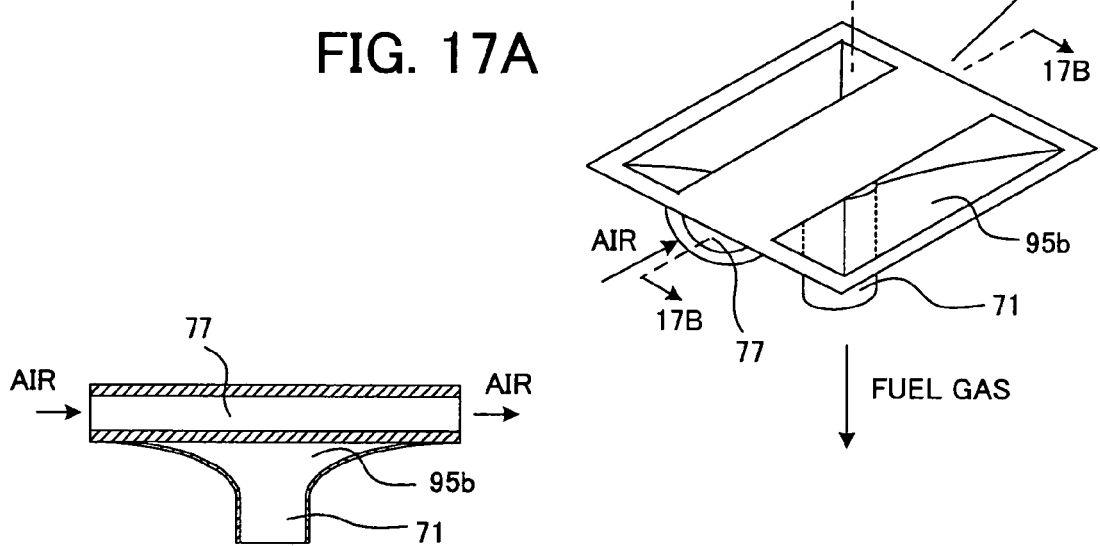
FIG. 17B is a sectional view taken in the line 17B-17B of FIG. 17A.

Further, as shown in FIG. 15C, the air supply passage 77 shown as a pipe in the first embodiment passes thorough the inside of the fuel gas manifold 95b disposed between the fuel gas discharge passage 71 and the plurality of fuel gas channels 40, and thus a part of the air supply passage 77 is integrated with the fuel gas manifold 95b and the body of the fuel cell stack 1. The detailed structure of the fuel gas manifold 95b is shown in FIGS. 17A and 17B. Thus the structural strength of the assembly 60 can be further improved in comparison to the first embodiment.

Modifications and variations of the embodiments described above will occur to those skilled in the art, in light of the above teachings.

In the above embodiments, although the air electrode 4 has been divided into two sections, it is not limited in this regard and may be divided in multiple sections. Furthermore although the air electrode has been divided into two equal sections, it is not limited in that respect.

Instead of the humidity regulation module 5, a dehumidifier may provided. In this case, the water in the air discharged from the upstream air electrode 4a is dehumidified in the dehumidifier and recycled to a water tank. The fuel gas channel 40, the upstream oxidant gas channel 50a and the downstream oxidant gas channel 50b may be a collection a plurality of channels. In other words, the fuel gas channel 40, the upstream oxidant gas channel 50a and the downstream oxidant gas channel 50b may be divided into a plurality of more narrow channels disposed in a mutually parallel orientation as shown in FIG. 16A and FIG. 17A.

The entire contents of Japanese Patent Application P2002-252738 (filed Aug. 30, 2002) are incorporated herein by reference.

The scope of the invention is defined with reference to the following claims.

The invention claimed is:

1. A fuel cell assembly comprising:
   a fuel cell having first and second oxygen electrodes, a hydrogen electrode and an electrolyte membrane disposed between the hydrogen electrode and the first and second oxygen electrodes;
   a hydrogen gas channel for supplying fuel gas containing hydrogen to the hydrogen electrode, the hydrogen gas channel facing the hydrogen electrode;
   a first oxidant gas channel for supplying oxidant gas to the first oxygen electrode, the first oxidant gas channel facing the first oxygen electrode;
   a second oxidant gas channel for supplying the oxidant gas which has passed through the first oxidant gas channel to the second oxidant electrode, the second oxidant channel facing the second oxygen electrode;
   and a dehumidifier for dehumidifying the oxidant gas which has passed through the first oxidant gas channel, the dehumidifier being disposed downstream of the first oxidant gas channel and upstream of the second oxidant gas channel.

2. The fuel cell assembly as defined in claim 1, further comprising a humidifier for humidifying oxidant gas to be supplied to the first oxidant gas channel, the humidifier applying water removed by the dehumidifier to the oxidant gas to be supplied to the first oxidant gas channel.

3. The fuel cell assembly as defined in claim 2, wherein the dehumidifier and the humidifier constitute an integrated humidity regulation module, the humidity regulation module comprising a humid air passage, a dry air passage and a water permeable membrane between the humid air passage and the dry air passage, the water permeable membrane allowing movement of water from the humid air passage to the dry air passage,
   and wherein the oxidant gas which has passed through the first oxidant gas channel further passes through the humid air passage and the oxidant gas to be supplied to the first oxidant gas channel passes through the dry air passage.

4. The fuel cell assembly as defined in claim 3, wherein the integrated humidity regulation module is directly connected to a side surface of the fuel cell so as to serve as an air manifold directly connected to the first and second oxidant gas channels, the side surface is substantially parallel to a direction of lamination of the fuel cell.

5. The fuel cell assembly as defined in claim 4, wherein the humidity regulation module comprises a plurality of water permeable membranes each of which is a hollow fiber and the density of the plurality of water permeable membranes decreases away from the fuel cell.

6. The fuel cell assembly as defined in claim 4, further comprising an air supply passage connected between the first oxidant gas channel and the dry air passage of the humidity regulation module and a fuel gas manifold for collecting fuel gas from the fuel gas channel, wherein the air supply passage is integrated with the fuel gas manifold.

7. The fuel cell assembly as defined in claim 3, wherein a pressure regulation valve is provided between an inlet of the humid air passage and an outlet of the dry air passage.

8. The fuel cell assembly as defined in claim 7, further comprising a controller for controlling an opening of the pressure regulation valve in response to power required by the fuel cell.

9. The fuel cell assembly as defined in claim 1, further comprising a humidifier for humidifying the fuel gas containing hydrogen to be supplied to the hydrogen gas channel, the humidifier applying water removed by the dehumidifier to the fuel gas to be supplied to the hydrogen gas channel.

10. The fuel cell assembly as defined in claim 9, wherein the humidifier and the dehumidifier constitute an integrated humidity regulation module, and the humidity regulation module comprises a humid air passage, a dry fuel gas passage and a water permeable membrane between the humid air passage and the dry fuel gas passage, the water permeable membrane allowing movement of water from the humid air passage to the dry fuel gas passage,
   and wherein the oxidant gas which has passed through the first oxidant gas channel further passes though the humid air passage and the fuel gas to be supplied to the hydrogen gas channel passes though the dry fuel gas passage.

11. The fuel cell assembly as defined in claim 1, wherein the first oxidant gas channel is positioned on a downstream side with respect to the flow of the fuel gas and the second oxidant gas channel is positioned on an upstream side with respect to the flow of the fuel gas.

12. The fuel cell assembly as defined in claim 1, wherein fuel gas flows in the hydrogen gas channel in a substantially vertically downward direction.

13. The fuel cell assembly as defined in claim 12, wherein oxidant gas flows in a substantially horizontal direction in the first and second oxidant gas channels.

14. The fuel cell assembly as defined in claim 1, wherein the first oxygen electrode facing the first oxidant gas channel and the second oxygen electrode facing the second oxidant gas channel are physically separate.

15. The fuel cell assembly as defined in claim 14, wherein the first oxygen electrode is electrically connected to a first power regulation element and the second oxygen electrode is electrically connected to a second power regulation element, the first and second power regulation element are electrically connected to a positive terminal.

16. The fuel cell assembly as defined in claim 1, wherein the first oxygen electrode facing the first oxidant gas channel and the second oxygen electrode facing the second oxidant gas channel are physically connected.

17. A fuel cell system comprising:
the fuel cell assembly as defined in claim 1;
a fuel gas supply device for supplying the fuel gas containing hydrogen to the hydrogen gas channel; and
an air supply device for supplying the oxidant gas to the first oxidant channel.

* * * * *

UNITED STATES PATENT AND TRADEMARK OFFICE
CERTIFICATE OF CORRECTION

| | |
|---|---|
| PATENT NO. | : 7,553,567 B2 |
| APPLICATION NO. | : 10/525509 |
| DATED | : June 30, 2009 |
| INVENTOR(S) | : Koji Morita |

Page 1 of 1

It is certified that error appears in the above-identified patent and that said Letters Patent is hereby corrected as shown below:

On the title page:

Under item "(73) Assignee", change "Nissan Moto Co., Ltd." to --Nissan Motor Co., Ltd.--.

Signed and Sealed this

Thirteenth Day of October, 2009

David J. Kappos
*Director of the United States Patent and Trademark Office*